United States Patent

Ross

[15] 3,702,990

[45] Nov. 14, 1972

[54] VARIABLE THRESHOLD MEMORY SYSTEM USING MINIMUM AMPLITUDE SIGNALS

[72] Inventor: Edward Charles Ross, Hightstown, N.J.

[73] Assignee: RCA Corporation

[22] Filed: Feb. 2, 1971

[21] Appl. No.: 111,875

[52] U.S. Cl. ..........340/173 R, 307/238, 340/173 FF

[51] Int. Cl. ..........................G11c 11/40, H03k 3/29

[58] Field of Search .....340/173 R, 173 FF; 307/238, 307/279

[56] References Cited

UNITED STATES PATENTS

| | | | |
|---|---|---|---|
| 3,618,051 | 11/1971 | Oleksiak | 340/173 R |
| 3,533,087 | 10/1970 | Zuk | 340/173 R |
| 3,588,848 | 6/1971 | Van Beck | 340/173 R |
| 3,387,286 | 6/1968 | Dennard | 340/173 R |
| 3,549,911 | 12/1970 | Scott | 340/173 R |

*Primary Examiner*—Bernard Konick
*Assistant Examiner*—Jay P. Lucas
*Attorney*—H. Christoffersen

[57] ABSTRACT

Selected devices of an MNOS array are placed in one threshold state by placing their gate electrodes at a first voltage level and their source and drain electrodes and their semiconductor substrate at a second voltage level. Selected devices are placed in a second threshold state by reversing the above mentioned voltage conditions. In both instances, appropriate voltages are applied to the non-selected devices to prevent them from changing their states. The substrate can be switched to assume various voltage levels.

9 Claims, 10 Drawing Figures

INVENTOR.
Edward C. Ross
BY
Henry Schanzer
ATTORNEY

INVENTOR.
Edward C. Ross
BY
Henry Schanzer
ATTORNEY

INVENTOR.
Edward C. Ross
BY
Henry Schanzer
ATTORNEY

VARIABLE THRESHOLD MEMORY SYSTEM USING MINIMUM AMPLITUDE SIGNALS

STATEMENT

The embodiment of the invention shown in FIGS. 2 and 5 were made in the course of or under a contract or subcontract thereunder with the Department of the Air Force.

BACKGROUND OF THE INVENTION

Field effect transistors such as the metal-nitride-oxide-silicon (MNOS) transistors capable of assuming two stable threshold states may be fabricated by large scale integrated circuit techniques to provide large memory arrays which are small, have a high information density, and are potentially inexpensive. It is desirable to be able to access such arrays by drive circuits which are themselves integrated into the memory array or which may be easily connected to the memory arrays.

In the design of such drive circuits, one of the parameters which must be taken into account is the large potential, typically 30 volts or more, which is required to be applied across the insulator of the MNOS transistors to set them to their stable states. In known prior art circuits, bipolar pulses of, typically, ±30 volts amplitude, which result in a total voltage swing of 60 volts, are used. Such pulses are applied by the drive circuits to the control electrodes of the transistors of the array. The drive circuits must thus have breakdown potentials considerably greater than, for example, 60 volts.

Integrated circuits normally available for driver circuits are not designed to withstand such high breakdown potentials. They have breakdown potentials in the range of 15 to 20 volts—less than one-half that needed when a memory array is operated in the conventional way described above. To make integrated circuits with higher breakdown potentials requires comprising other desirable characteristics of the devices. For example, to increase the drain-to-gate breakdown potential of an MOS transistor driver, its oxide thickness has to be increased. Increasing the oxide thickness decreases the transconductance of the device and increases its threshold voltage. Similarly, to increase the drain-to-source breakdown potential, of a device, its source-to-drain spacing could be increased. To deliver the same current as before, the device has to be made larger which requires more chip area with a resultant reduction of packing density. Alternatively, the breakdown potential of driver transistors may be increased by certain processing steps. This method, however, also increases the process complexity and the space requirement. Thus, to minimize the cost and/or the difficulty of manufacture, it is extremely important that the potential levels and the pulses applied to, and supplied by, the drive circuitry (to set the MNOS devices) be kept relatively low.

Some known prior art methods make use of half-select schemes to achieve low voltage level operation of MNOS arrays. In half-select schemes, the threshold level of a selected device may be set, for example, by applying a first pulse (e.g., +15 volts) to its control electrode and a pulse of opposite polarity (e.g., −15 volts) to its substrate and to its source and/or drain electrodes. The problem with these schemes is that the non-selected devices are disturbed (i.e., a 15 volt pulse is applied across their insulator regions) resulting in memory array systems which are, at best, marginally operable.

Thus, conceptually, it is well established that an electric field of one polarity applied across the insulator region of a device sets it to one stable state and a field of opposite polarity applied across the insulator region of the device sets it to another stable state. However, the operation of interconnected devices, as in an array, poses formidable problems. In an array having a semiconductor substrate, the substrate is common to all the devices and pulsing the substrate affects all the devices. Also, in an array, the gate electrode of a selected device is common to the gate electrodes of some of the non-selected devices and the source and drain electrodes of selected devices are common to the source and drain electrodes of some of the non-selected devices. Applying the potentials necessary to set a selected device affects every other device of the array. It is, therefore, crucial in an array arrangement to be able to set a selected device to one of two stable states without disturbing any other device in the array.

A purpose of this invention is to provide a variable threshold device array interconnected in such a way that it may be operated at relatively low peak-to-peak drive voltages and in which the non-selected devices are not disturbed.

SUMMARY OF THE INVENTION

A matrix array of field-effect semiconductor devices, each device having a control electrode and first and second electrodes defining the ends of a conduction path and of the type having at least two threshold levels. The devices are arranged in rows and columns with the devices of a row having their conduction paths connected between two bit lines and the devices of a column having their control electrode connected in common to a word line. Means are provided for applying first and second potentials, the potential difference between said potentials being equal to or greater than a given reference value, across said devices in a direction to either inhibit or enhance conduction for setting selected ones of said devices to one or the other of their threshold states.

BRIEF DESCRIPTION OF THE DRAWINGS

In the accompanying drawings, like reference characters denote like components.

DETAILED DESCRIPTION OF THE INVENTION

The semiconductor devices contemplated for use in practicing the invention have a variable threshold voltage which may be set to one of two of a multiplicity of values by applying a potential of greater than given amplitude between the gate and substrate of the device and which maintain the threshold voltage ($V_T$) to which they are set for a considerable period of time. Included in this class of devices are bistable field-effect transistors having a metal-insulator-semiconductor (MIS) structure in which charge can be stored.

A specific, but not limiting, example of the above type of transistor is one whose insulating layer is a double layer of silicon nitride and silicon dioxide and which is commonly referred to as an MNOS (metal-nitride-oxide-silicon) device. This transistor may be fabricated using standard metal-oxide-semiconductor (MOS) techniques, except that just prior to metallization, the gate oxide is made very thin and a nitride layer is deposited between the silicon dioxide and the gate of the device. The resulting transistor may be of either the P-type or the N-type and has first and second electrodes defining the ends of a conduction path and a gate electrode which is used to control the level of conduction in the conduction path. The transistor has the same general characteristics as a standard MOS device except that the addition of the insulating nitride layer over the thin oxide region allows charge to be stored at or near the interface between the two insulators and results in the characteristics shown in FIG. 1.

Figure 1:
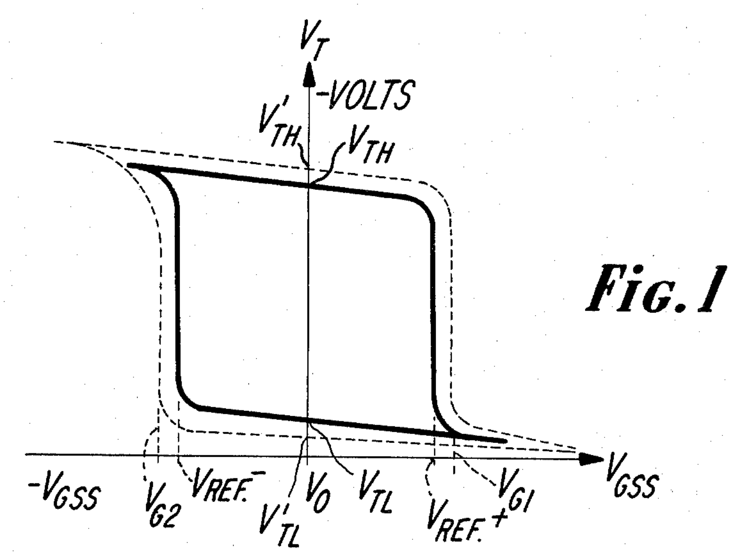
FIG. 1 is a plot of threshold voltage ($V_T$) as a function of the applied gate to substrate potential illustrating the bistable characteristics of the devices used to practice the invention.

FIG. 1 is an idealized representation of the hysteresis characteristic of the threshold voltage ($V_T$) of a P-type conductivity device as a function of applied gate-to-substrate voltage ($V_{GSS}$) of a typical device such as discussed above. The threshold voltage ($V_T$) is defined as the gate potential at which current may start to flow in the conduction path of the transistor. The point marked $V_{TL}$ refers to the low value of $V_T$ and the point marked $V_{th}$ refers to the high value of $V_T$. $V_{TL}$ may, for example, be minus 2 volts and $V_{TH}$ may be minus 6 volts. The reference voltages $V_{REF}^+$ and $V_{REF}^-$ indicate the gate-to-source potentials at which the transistor changes state. The value of $V_{REF}^+$ and $V_{REF}^-$ depends upon the particular device employed, however, for purposes of the present discussion they are assumed to be between −15 volts and +15 volts.

Any value of $V_{GSS}$ (for a given pulse duration) smaller than $V_{REF}^+$ or $V_{REF}^-$ does not affect the threshold setting of the semiconductor device depicted in FIG. 1. However, if $V_T$ initially is $V_{TL}$ and $V_{GSS}$ is made greater and more negative than $V_{REF}^-$, the threshold voltage follows the hysteresis curve upward as shown in FIG. 1, and takes on the value of $V_{TH}$. When, and if, $V_{GSS}$ is subsequently reduced to zero volts, $V_T$ remains set at $V_{TH}$. If the threshold voltage initially is $V_{TH}$ and $V_{GSS}$ is made greater and more positive than $V_{REF}^+$, the threshold voltage follows the hysteresis curve downward and $V_T$ takes on the value of $V_{TL}$. When, and if, $V_{GSS}$ is subsequently reduced to zero volts, $V_T$ remains set at $V_{TL}$.

It should be noted that the MNOS transistors under discussion are analog devices which are capable of being set to a number of threshold states. That is, for example, by applying a $V_{GSS}$ greater than $V_{REF}^+$, ($V_{G1}$), the P-type transistor may be set to a $V_{TL}'$ state as shown in FIG. 1. Alternatively, by applying a $V_{GSS}$ which is more negative than $V_{REF}^-$, ($V_{G2}$), the P-type transistor may be set to a $V_{TH}'$ state as shown in FIG. 1. However, in practice, for most logic applications, the voltages applied between the gate, the substrate and the electrodes of the devices are limited to specific levels (±V) such that the devices are caused to assume only one of two of the many available threshold conditions. Note that for the N-type transistors a $V_{GSS}$ more negative than $V_{REF}^-$ (in a direction to inhibit conduction) sets the device to a low threshold voltage state and a $V_{GSS}$ more positive than $V_{REF}^+$ (in a direction to enhance conduction) sets the device to a high threshold voltage state.

Figure 2:
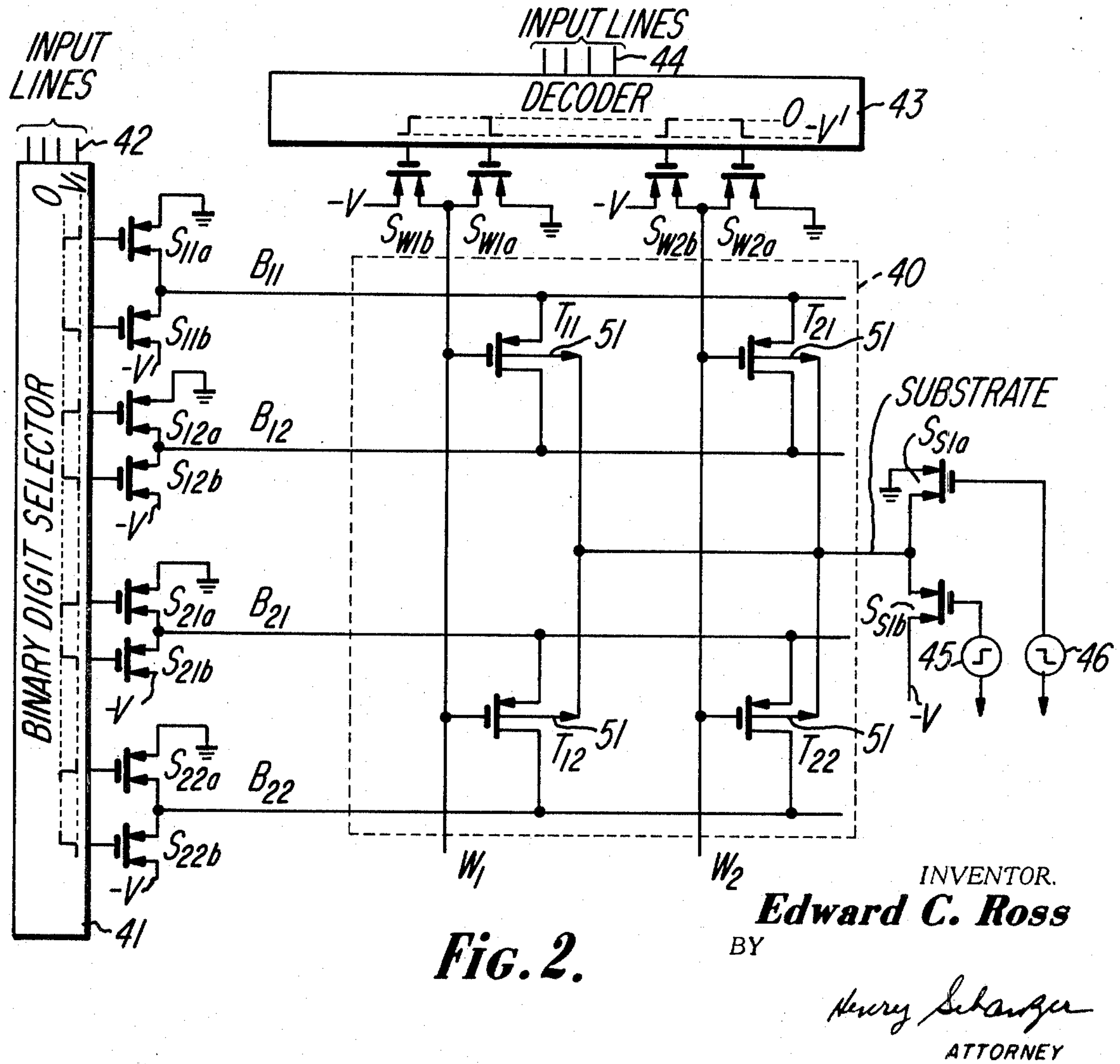
FIG. 2 is a schematic drawing of a matrix array and the circuitry for driving the array embodying the invention.

The system of FIG. 2 includes a memory array 40 whose word lines ($W_1$, $W_2$), whose bit lines ($B_{11}$, $B_{12}$, $B_{21}$, $B_{22}$) and whose substrate 51 are selectively connected either to a first circuit point which is fixed to ground potential or to a second circuit point which is fixed to a potential of −V volts. The choice is made by means of bidirectional switches illustrated by insulated-gate field-effect transistors (IGFETS) of P-type conductivity operated as transmission gates.

The array 40 may have M words of j bits each where M and *j* are integers greater than 1, and M and *j* may, or may not, be equal. For ease of illustration in the circuit of FIG. 2, $M=j=2$. Each bit location includes a single bistable transistor denoted by $T_{Mj}$ where *M* defines the word (column) position and *j* defines the bit (row) position. The transistors making up a column (word) have their gate electrodes connected in common to a word line. The transistors making up a row (all having the same bit significance) have their source electrodes connected to a first bit line denoted $B_{j1}$ and their drain electrodes connected to a second bit line denoted $B_{j2}$ where *j* as before refers to the bit significance of the row.

Associated with each bit line is a pair of transistors denoted by $S_{jna}$ and $S_{jnb}$; where *j* indicates the order of the row, *n* denotes whether it is the first (1) or the second (2) bit line of a row, the subscript *a* refers to the transistor having its conduction path connected between the bit line and ground potential, and the subscript *b* refers to the transistor having its conduction path connected between the bit line and −V potential.

During the clear and write cycle as further described below, the bit lines are returned to the same value of potential. This ensures that there is substantially no potential difference between the two bit lines of a row and thus substantially no current flow therebetween. The switches are operated in tandem during the write cycle, but they are independently controlled, and the potential on the bit lines is independent of the impedance or ratio of impedance of the switches. The turn "on" and turn "off" of the bit line transistor switches is controlled by binary digit selector 41 whose output leads are connected to the gates of the bit line switches.

Each word line ($W_1$, $W_2$) is connected to a pair of transistors denoted by $S_{wma}$ and $S_{wmb}$; where *m* denotes the order of the word line, and the subscript *a* refers to the transistor having its conduction path connected between the word line and ground potential and the subscript *b* to the transistor having its conduction path connected between the word line and −V volts. The turn "on" and turn "off" of the word line switches is controlled by decoder 43 whose outputs are connected to the gates of the word line switches.

Decoder 43 and selector 42 produce different patterns of pulses on their output leads in response to signals applied to their input lines 42 and 44, respectively, by a control means (not shown) such as a computer. Such decoders are well known in the art and need no further explanation.

The substrate, 51, common to all the transistors of the array, is connected to the common connection between the conduction paths of transistors $S_{s1a}$ and $S_{s1b}$. The other end of the conduction path of transistor $S_{s1a}$ is connected to ground (zero volts) and the other end of the conduction path of transistor $S_{s1b}$ is connected to −V volts. Thus depending on which of these transistors is turned on, the substrate may be connected to ground or to −V volts. These transistors are controlled by signal sources 45, 46 which may be part of either decoder 43 or selector 41. The addition of switches $S_{s1a}$ and $S_{s1b}$ is of great significance since they enable the pulsing of the substrate as further described below.

The transistor pair associated with each bit line, with each word line, and with the substrate performs the function of a single-pole, double-throw switch. It should be evident that any circuit arrangement performing the equivalent function could, therefore, be used instead of the transistor pair.

Figure 3:
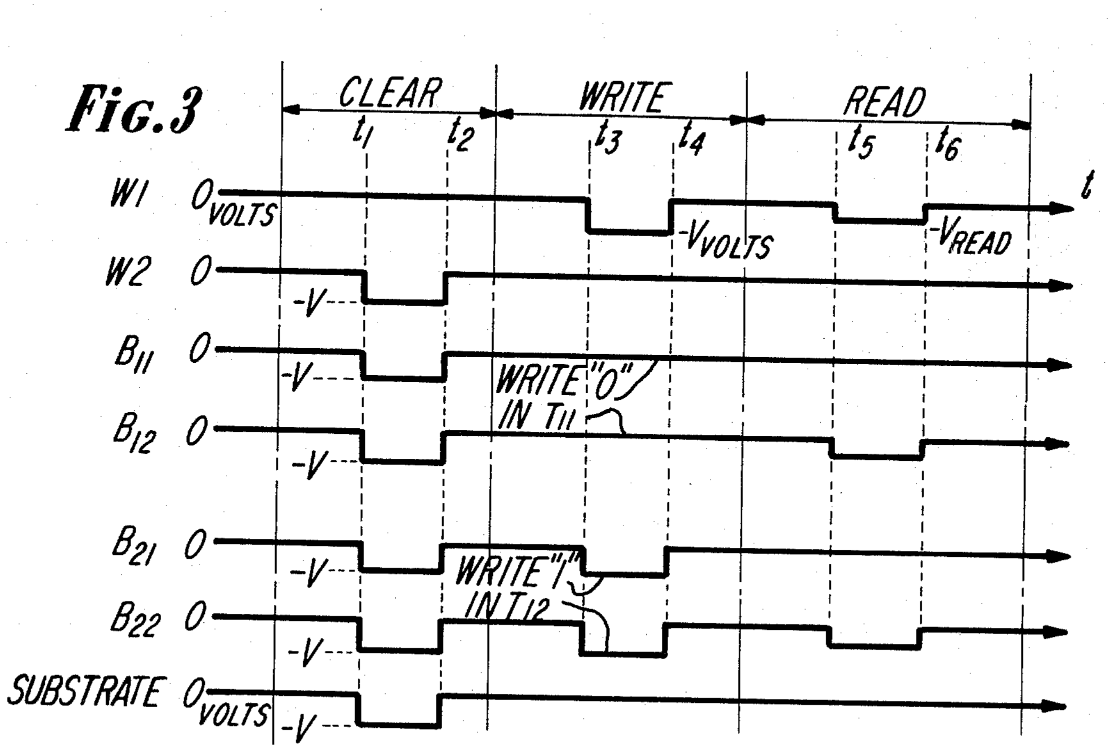
FIG. 3 is a drawing of some of the waveforms associated with the circuit of FIG. 2.

The operation of each column being identical to that of any other column, only column 1, arbitrarily selected, is described in detail with the aid of waveform diagrams of FIG. 3.

Figure 4A:
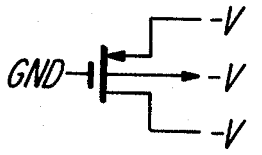
FIGS. 4*a*, 4*b*, 4*c*, 4*d*, 4*e*, and 4*f* are schematic drawings of a typical element of the array of FIG. 2 under various bias conditions.

First, from time $t_1$ and $t_2$ during the "clear" cycle, the elements of column 1 are all set to the $V_{TL}$ state. As shown in FIG. 3, ground potential is applied to the word 1 line ($W_1$) by turning on transistor $S_{w1a}$ and −V volts is applied to all the bit lines ($B_{j1}$, $B_{j2}$) as well as the substrate and the unselected word lines ($W_2$) by energizing their associated switching transistors with the *b* subscript. The potential applied to each of the transistors ($T_{11}$, $T_{12}$) of column 1 is as shown in FIG. 4*a*. That is, ground potential is applied to the gate electrodes and −V volts is applied to the drain, source and substrate of the devices. Since the elements are P-type devices, the positive electric field applied to the gate with respect to the substrate causes the elements of column 1 to be switched to the low threshold voltage ($V_{TL}$) state as illustrated in FIG. 1.

Figure 4B:
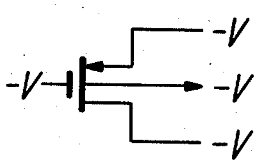

The transistors in the non-selective columns (i.e., $T_{21}$, $T_{22}$) have −V volts applied to all their electrodes as shown in FIG. 4*b*. This ensures that the transistors in the non-selected columns of the array are undisturbed since all their electrodes are kept at the same potential. Thus, by pulsing or applying a negative potential to the substrate and to the non-selected word lines while grounding the selected word lines, the elements of the selected word lines are set to the $V_{TL}$ state.

Figure 4C:
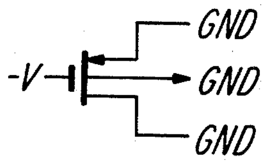

Assume now, as is illustrated from time $t_3$ to $t_4$ of the write cycle of FIG. 3, that it is desired to set element $T_{11}$ so that its threshold voltage is switched to the high state ($V_{TH}$) [write 0]. Transistor $T_{11}$ must be switched while transistor $T_{12}$ is maintained in the $V_{TL}$ state [write 1] and the remaining elements of the array are undisturbed. Element $T_{11}$ is set to $V_{TH}$ by applying ground potential to the substrate (via $S_{1a}$) and to bit lines $B_{11}$ and $B_{12}$ and by applying −V volts (via $S_{w1b}$) to word line 1 ($W_1$). (These voltages applied to transistor $T_{11}$ are shown in FIG. 4*c*). The negative level or pulse of −V amplitude applies a bias to the gate with respect to the substrate which is greater than the given reference value ($V_{REF}^-$) and which is in a direction to enhance conduction of transistor $T_{11}$. The potentials applied to transistor $T_{11}$ to set it to $V_{TH}$ are the reverse of the potentials applied to $T_{11}$ to set it to $V_{TL}$. For the bias condition as shown in FIG. 4*c* there is a uniform electric field between the gate and the substrate over the length of the conduction channel existing between the drain and source regions of the transistor. Since the source and drain have the same applied potential, there is no steady state drain-source current.

Having set element $T_{11}$ to $V_{TH}$ it remains to be seen that the remaining elements of the array are undisturbed. Particularly, it will be seen that neither those non-selected elements sharing the same column nor those sharing the same row as the selected transistor ($T_{11}$) are disturbed.

Figure 4D:
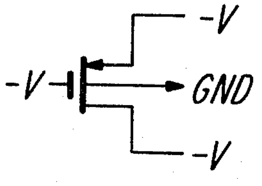

Elements $T_{12}$ which shares the same word line as transistor $T_{11}$ has its gate connected to $W_1$ and therefore has −V volts applied to it. To prevent transistor $T_{12}$ from switching state, −V volts is applied to bit lines $B_{21}$ and $B_{22}$ by turning on transistors $S_{21b}$ and $S_{22b}$. The resulting bias condition of the transistor is illustrated in FIG. 4d. At first glance, it might seem that transistor $T_{12}$ should also switch to the $V_{TH}$ state since it has −V volts applied between the gate (−V volts) and the substrate (ground potential. However, a detailed analysis reveals that the −V potential applied to the gate induces a conduction channel between the source and drain. Since the source and drain are both at −V volts, the potential of the conduction channel will be −V volts. There is, therefore, little, if any, potential differential across the insulating layers and the transistor remains in its previously set $V_{TL}$ state. Therefore, transistor $T_{12}$ as well as any other memory location in the same column (sharing the same word line) as $T_{11}$ will be undisturbed. Note again that the source and drain are maintained at the same potential and there is thus no current flow through the device.

Element $T_{21}$ which shares the same row as transistor $T_{11}$ has its gate, substrate, source and drain grounded. Under this bias condition, illustrated in FIG. 4*f*, the transistor remains undisturbed.

Figure 4E:
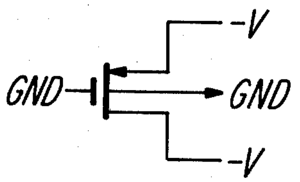
Figure 4F:
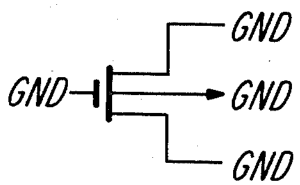

Element $T_{22}$ which shares the same row as element $T_{12}$ has its gate and substrate connected to ground potential and its source and drain electrodes connected to −V volts as shown in FIG. 4*e*. Under this bias condition, the gate to substrate potential ($V_{GSS}$) is nearly zero volts and a potential difference of −V volts amplitude exists across the source-to-substrate and drain-to-substrate junctions. The potential difference results in an electric field whose effect is limited, for practical purposes, to the junction between the P-regions comprising the source and drain and the substrate. The potential of the conduction channel between the source and drain regions remains near ground potential and the transistor remains undisturbed.

It has thus been shown that, by pulsing the substrate to −V volts during the clear cycle and using the substrate as a control electrode, a single unipolar source of potential may be used to set the elements of the array.

It has furthermore been shown that the maximum signals appearing on any of the word lines is —V volts (e.g., —30 volts) or ground (e.g., 0 volts) which means that the maximum potential difference across the driving circuitry is V volts which may be of the order of 30 volts. As a result, the drain-to-source or source-to-gate potential or drain-to-gate potential of the driving circuitry need not exceed V volts as compared to 2 × V volts required in prior art circuitry. Thus, for example, the drive circuits have to sustain a maximum potential differential of 30 volts as compared to the prior art method of applying bipolar pulses where the drive circuits had to sustain a potential differential of 60 volts.

The information stored in the array of the present application may, as shown from time $t_5$ to $t_6$ of the read cycle in FIG. 3, be read out nondestructively a word at a time by applying a read voltage ($V_R$) which is greater than $V_{TL}$ to the selected word line and by applying zero volts to the $B_{j1}$ lines and typically —5 volts to the $B_{j2}$ lines. For the example discussed above, with $T_{11}$ set to $V_{TH}$ and $T_{12}$ set to $V_{TL}$ and with $V_R$ applied to word line $W_1$, transistor $T_{12}$ will conduct while transistor $T_{11}$ remains non-conducting.

Figure 5:
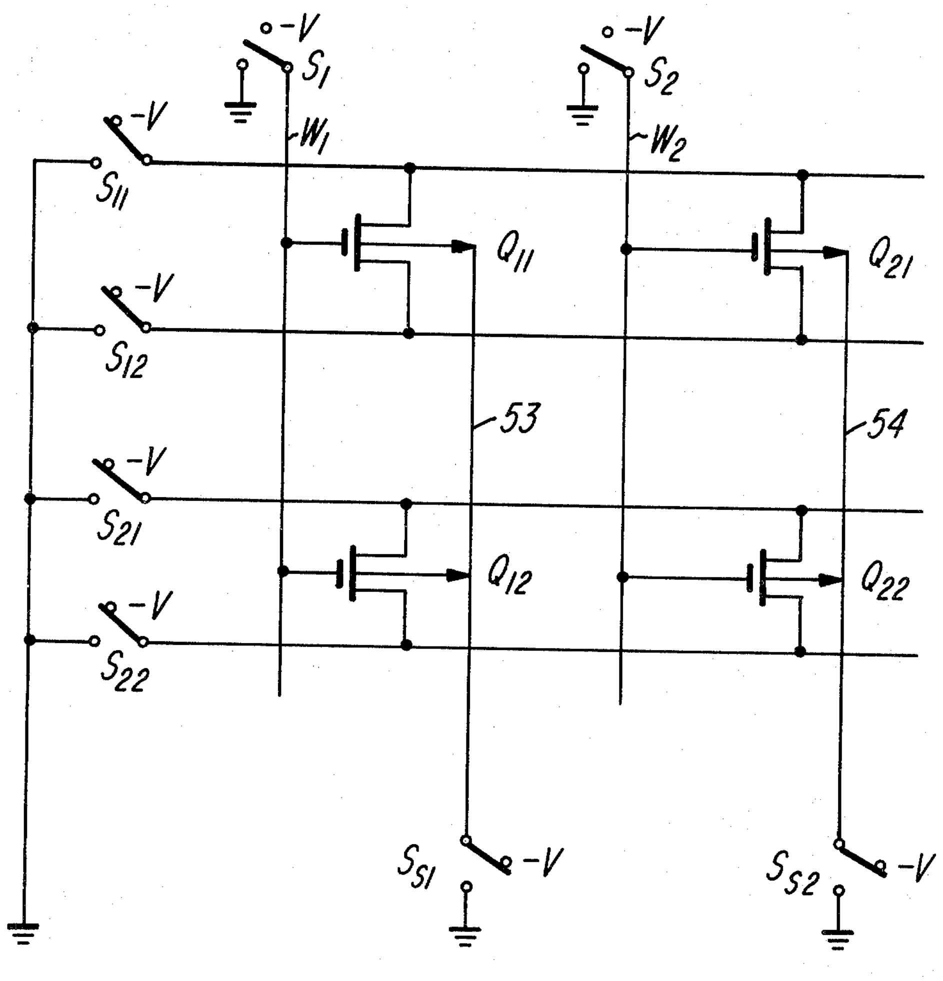
FIG. 5 is a schematic drawing of a matrix array and the circuitry for driving the array embodying the invention.

In the embodiment of FIG. 5 the elements of word 1 ($Q_{11}$, $Q_{12}$) and the elements of word 2 ($Q_{21}$, $Q_{22}$) are formed on individually isolated substrate (53, 54). For ease of illustration, the column and row transistor switches shown in FIG. 2 are replaced by single-pole, double-throw switches in the drawing of FIG. 5. To each substrate (53, 54) there is connected a switch ($S_{s1}$, $S_{s2}$) which enables either —V volts or ground potential to be selectively applied to the respective substrates. The operation of the selected word lines of the array is as described above for the arrangement of FIG. 2 and the pulse sequence is as shown in FIG. 3 except that non-selected word lines remain at ground. The use of individual substrates per word line provides greater freedom in setting the elements. For example, with this arrangement, since the word lines and the substrates of nonselected columns are kept at zero volts while information is being written into the remainder of the array, the selection circuitry is greatly simplified.

The MNOS memory array of FIG. 5 may be constructed in bulk silicon in which case the word or column substrates are isolated by diffusions. Alternatively, the array of FIG. 5 may be fabricated on silicon on an insulating substrate such as sapphire which provides dielectric isolation. The arrangement of FIG. 5 is another example in which the elements of the array may be set to their $V_{TH}$ or $V_{TL}$ states using a single unipolar source of potential. As in the circuit of FIG. 2, the maximum potential applied to the word lines or the bit lines is —V volts (e.g., —30 volts) or zero volts. Thus, the driving circuits sustain a maximum stress of only V volts (e.g., 30 volts).

What is claimed is:

1. The combination comprising:

an array of field-effect devices arranged in columns and rows; each device having a control electrode, a first and a second electrode defining a conduction path and having a substrate region between said first and second electrodes, and each device of the type capable of assuming two threshold levels, each row of the array comprising a first bit line to which the first electrode of all devices in the row are connected and a second bit line to which the second electrode of all devices in the row are connected and each column of the array comprising a single word line to which the control electrode of all devices in that column are connected;

connections for first and second voltages, the difference in potential between said voltages being greater than a given reference value;

a plurality of switch means, equal to the number of bit lines plus the number of word lines, one switch means connected to each line, each switch means for selectively connecting its line to the connection for the first voltage or the connection for the second voltage;

means connecting the substrates of all of said devices in common at a substrate terminal;

a substrate switch means connected to said substrate terminal for selectively connecting said substrate terminal to the connection for the first voltage or the connection for the second voltage;

means for setting the threshold level of a device to one of said two threshold levels, including means for operating the switch means for applying to each bit line, to said substrate terminal, and to non-selected word lines the same one of said first and second voltages, and for concurrently applying to selected word lines the other one of said first and second voltages, the relative polarity of said voltages being in a direction to inhibit conduction of the devices; and means for setting, a column at a time, selected ones of said devices to the other one of said two threshold levels, including means for operating the switch means associated with the two bit lines of the selected devices and the substrate terminal to apply to said two bit lines and the substrate terminal said other one of said first and second voltages, and for operating the switch means associated with the word lines of the selected transistors and the two bit lines of the non-selected transistors to apply thereto said one of said first and second voltages, the relative polarity of said voltages being in a direction to enhance conduction of the selected transistors.

2. In combination:

an array of metal-nitride-oxide semiconductor (MNOS) memory devices arranged in columns and rows and formed on a semiconductor substrate, each device having a conduction path and a gate electrode;

a plurality of column conductors, each column conductor connected to the gate electrodes of all devices in that column;

a plurality of pairs of row conductors, each pair connected across the conduction paths of all devices in its row;

means for placing the devices in a selected column in one state comprising means for placing the substrate and all of the row conductors at a first potential and means for placing the conductor for that column at a reference potential, the potential difference between said first and reference potentials being greater than a given reference value and being of a polarity to inhibit conduction through the devices in that column; and means for changing the state of a device, in a selected column and in a selected row to a second state, comprising means for applying to that column conductor and to the row conductors of the non-selected rows said first potential and means for placing the substrate, the pair of conductors in the selected rows, and the non-selected columns at said reference potential.

3. The combination comprising:

an array of field-effect devices, arranged in columns and rows and formed on a semiconductor substrate, each device having a control electrode and first and second electrodes defining a conduction path, and each device of the type capable of assuming two threshold levels, each row of the array comprising a first bit line to which the first electrode of all devices in the row are connected and a second bit line to which the second electrode of all devices in the row are connected and each column of the array comprising a single word line to which the control electrode of all devices in that column are connected;

connections for first and second voltages, the difference in potential between said voltages being greater than a given reference value;

a plurality of switch means, equal to the number of bit lines plus the number of word lines, one switch means connected to each line, each switch means for selectively connecting its line to the connection for the first voltage or the connection for the second voltage;

a substrate switch means connected to said substrate for selectively connecting said substrate to the connection for the first voltage or the connection for the second voltage;

means for setting the threshold level of a device to one of said two threshold levels, including means for operating the switch means for applying to each bit line, to said substrate, and to non-selected word lines the same one of said first and second voltages, and for concurrently applying to selected word lines the other one of said first and second voltages, the relative polarity of said voltages being in a direction to inhibit conduction of the devices; and means for setting, a column at a time, selected ones of said devices to the other one of said two threshold levels, including means for operating the switch means associated with the two bit lines of the selected devices and the substrate to apply to said two bit lines and the substrate said other one of said first and second voltages, and for operating the switch means associated with the word lines of the selected transistors and the two bit lines of the non-selected transistors to apply thereto said one of said first and second voltages, the relative polarity of said voltages being in a direction to enhance conduction of the selected transistors.

4. The combination as claimed in claim 3 wherein each switch means comprises a single-pole, double-throw switch means.

5. The combination as claimed in claim 3 wherein each one of said devices consists of a single transistor.

6. The combination as claimed in claim 3 wherein each one of said switch means includes at least one insulated-gate field-effect transistor.

7. The combination as claimed in claim 6 wherein said switch means transistors are of the same conductivity type as said array devices.

8. The combination as claimed in claim 7 wherein said array devices are metal-nitride-oxide-silicon (MNOS) transistors of P-type conductivity.

9. The combination as claimed in claim 7 wherein said one of said first and second voltages is ground potential.

* * * * *